United States Patent
Huang

(10) Patent No.: US 9,004,699 B2
(45) Date of Patent: Apr. 14, 2015

(54) LIGHT SOURCE SYSTEM FOR USE IN A PROJECTOR AND HAVING A FIRST LIGHT SOURCE ARRAY AND A SECOND LIGHT SOURCE ARRAY

(75) Inventor: June-Jei Huang, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 335 days.

(21) Appl. No.: 13/302,292

(22) Filed: Nov. 22, 2011

(65) Prior Publication Data

US 2012/0275146 A1 Nov. 1, 2012

(30) Foreign Application Priority Data

Apr. 29, 2011 (TW) .............................. 100115000 A

(51) Int. Cl.
G02B 27/14 (2006.01)
G03B 21/20 (2006.01)
G03B 33/06 (2006.01)

(52) U.S. Cl.
CPC ............ *G02B 27/146* (2013.01); *G02B 27/143* (2013.01); *G03B 21/2013* (2013.01); *G03B 21/2033* (2013.01); *G03B 33/06* (2013.01); *G02B 27/141* (2013.01); *G02B 27/149* (2013.01)

(58) Field of Classification Search
CPC ............. G03B 21/208; G03B 21/2013; G03B 21/2033; G02B 27/141; G02B 27/143; G02B 27/146; G02B 27/149; G02B 27/0972; G02B 27/0977
USPC .......................... 353/37, 50, 73, 77, 78, 98, 99
See application file for complete search history.

(56) References Cited

U.S. PATENT DOCUMENTS

| 5,048,911 A | 9/1991 | Sang et al. |
| 6,193,393 B1 * | 2/2001 | Dove et al. ...................... 362/19 |
| 6,229,831 B1 | 5/2001 | Nightingale et al. |
| 6,240,116 B1 | 5/2001 | Lang et al. |
| 6,356,577 B1 * | 3/2002 | Miller ........................... 372/107 |
| 6,517,212 B2 * | 2/2003 | Satou .............................. 353/99 |

(Continued)

FOREIGN PATENT DOCUMENTS

| CN | 1196971 C | 4/2005 |
| CN | 100456580 C | 1/2009 |

(Continued)

OTHER PUBLICATIONS

First Office Action for Taiwanese Application No. 100115000 dated Oct. 28, 2013 with English Summary.

(Continued)

*Primary Examiner* — Sultan Chowdhury
*Assistant Examiner* — Bao-Luan Le
(74) *Attorney, Agent, or Firm* — Cantor Colburn LLP

(57) ABSTRACT

A light source system for use in a projector is provided. The light source system comprises a main optical axis, a first sub-optical axis, a second sub-optical axis, at least one first optical module, at least one second optical module and a third optical module. The at least one first optical module comprises a first light source array and a second light source array for emitting a plurality of first beams and a plurality of second beams respectively. The at least one second optical module comprises a third light source array for emitting a plurality of third beams. The third optical module integrates the first beams, the second beams and the third beams into a main beam for projection along the main optical axis.

17 Claims, 7 Drawing Sheets

(56) References Cited

U.S. PATENT DOCUMENTS

| | | |
|---|---|---|
| 7,006,549 B2 | 2/2006 | Anikitchev et al. |
| 7,237,909 B2 * | 7/2007 | Yokote et al. .................... 353/94 |
| 7,515,346 B2 | 4/2009 | Govorkov et al. |
| 8,434,877 B2 * | 5/2013 | Kodama et al. ................. 353/94 |
| 8,474,981 B2 * | 7/2013 | Sudo et al. ...................... 353/37 |
| 8,905,578 B2 * | 12/2014 | Svensen et al. ............... 362/241 |
| 2003/0090632 A1 * | 5/2003 | Kim et al. ....................... 353/31 |
| 2004/0067016 A1 | 4/2004 | Anikitchev et al. |
| 2004/0252285 A1 * | 12/2004 | Lang et al. ....................... 353/94 |
| 2005/0117337 A1 * | 6/2005 | Ishii et al. ...................... 362/241 |
| 2005/0179884 A1 | 8/2005 | Gui et al. |
| 2006/0274434 A1 * | 12/2006 | Mino et al. .................... 359/811 |
| 2006/0285076 A1 * | 12/2006 | Takeda et al. ................... 353/22 |
| 2008/0218704 A1 * | 9/2008 | Yagyu .............................. 353/98 |
| 2009/0141242 A1 * | 6/2009 | Silverstein et al. ............. 353/20 |
| 2010/0277699 A1 * | 11/2010 | Silverstein et al. ............. 353/37 |

FOREIGN PATENT DOCUMENTS

| | | |
|---|---|---|
| CN | 101290362 B | 10/2010 |
| CN | 101878655 A | 11/2010 |
| TW | M244481 U | 9/2004 |
| TW | 200508781 | 3/2005 |
| TW | 200832038 A | 8/2008 |
| TW | 201109729 A | 3/2011 |
| WO | 0106297 A2 | 1/2001 |

OTHER PUBLICATIONS

Summary of the First Chinese Office Action; International Application No. 201110118016.9; mailing date: Mar. 24, 2014.

* cited by examiner

LIGHT SOURCE SYSTEM FOR USE IN A PROJECTOR AND HAVING A FIRST LIGHT SOURCE ARRAY AND A SECOND LIGHT SOURCE ARRAY

This application claims priority to Taiwan Patent Application No. 100115000 filed on Apr. 29, 2011.

CROSS-REFERENCES TO RELATED APPLICATIONS

Not applicable.

BACKGROUND OF THE INVENTION

1. Field of the Invention

The present invention relates to a light source system, and in particular, to a light source system with a plurality of laser arrays for use in a projector.

2. Descriptions of the Related Art

To cater for demands of high brightness, high luminance and a high color rendering index, most conventional projectors adopt an ultra high power (UHP) lamp as a light source.

With advancement of semiconductor photoelectric technologies over recent years, solid-state light sources featuring a long service life, intensive brightness, and a rapid response speed such as light emitting diodes (LEDs) and lasers have received more and more attention in the art and are expected to replace the conventional UHP lamps as light sources of the projectors.

However, compared to UHP lamps, the solid-state light sources of the prior art can only provide a low image brightness due to the low lumen; this makes it difficult to gain popularity from general consumers.

Accordingly, an urgent need exists in the art to minimize the volume of a solid-state light source so that it is more suitable for use in a miniaturized projector while still providing an adequate brightness level.

SUMMARY OF THE INVENTION

An objective of the present invention is to provide a light source system and a projector using the same. By using a plurality of laser sources with a particularly designed structure, the light source system can provide improved brightness while still be minimized in volume.

To achieve the aforesaid objective, the light source system for use in a projector according to the present invention comprises a main optical axis, a first sub-optical axis, a second sub-optical axis, at least one first optical module, at least one second optical module and a third optical module. The at least one first optical module comprises a first light source array and a second light source array adapted to emit a plurality of first beams and a plurality of second beams respectively. The at least one second optical module comprises a third light source array adapted to emit a plurality of third beams. The third optical module is adapted to integrate the first beams, the second beams and the third beams into a main beam for projection along the main optical axis.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
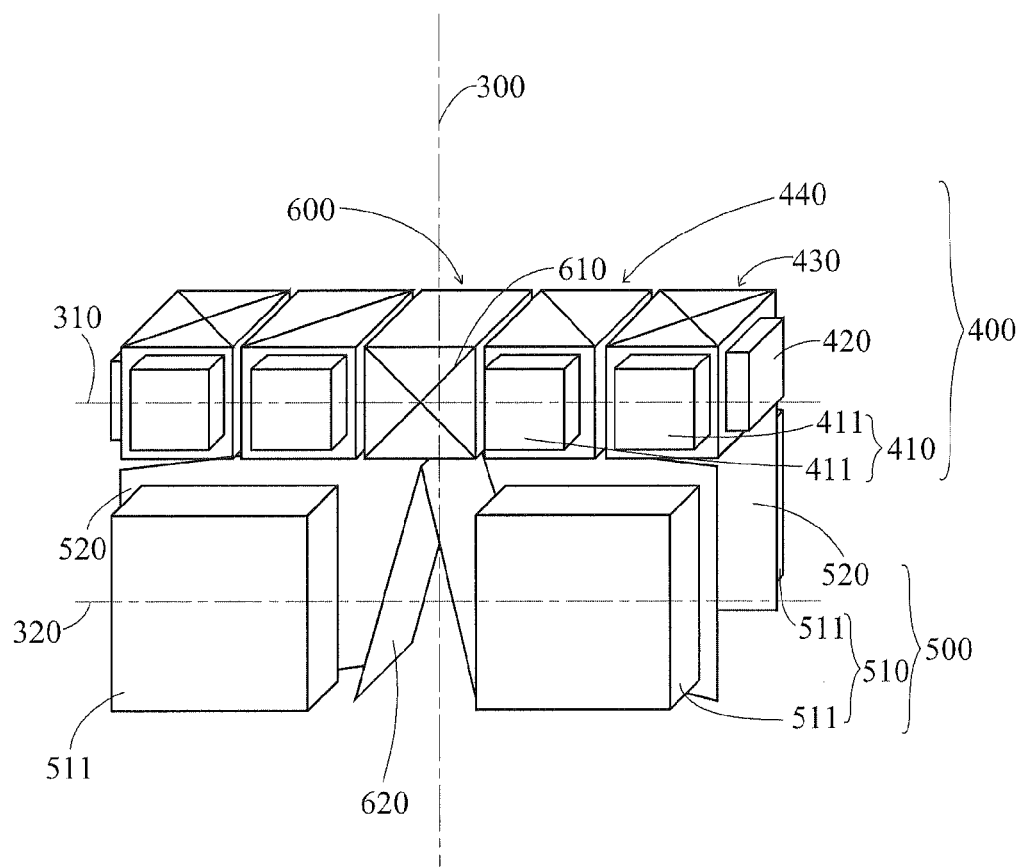
FIG. 1 is a schematic perspective view of a light source system according to the present invention.

A light source system for use in a projector is provided in the present invention. The light source system comprises a main optical axis, a first sub-optical axis, a second sub-optical axis, at least one first optical module, at least one second optical module and a third optical module. Specifically, as shown in FIG. 1, a light source system 200 of this embodiment comprises a main optical axis 300, a first sub-optical axis 310, a second sub-optical axis 320, two first optical modules 400, two second optical modules 500 and a third optical module 600. In this embodiment, the first sub-optical axis 310 is preferably disposed in parallel with the second sub-optical axis 320, and both the first sub-optical axis 310 and the second sub-optical axis 320 are orthogonal to the main optical axis 300. Meanwhile, the two first optical modules 400 described above are disposed along the first sub-optical axis 310 at two opposite sides of the main optical axis 300, and similar to the two first optical modules 400, the two second optical modules 500 are disposed along the second sub-optical axis 320 at two opposite sides of the main optical axis 300.

Figure 2:
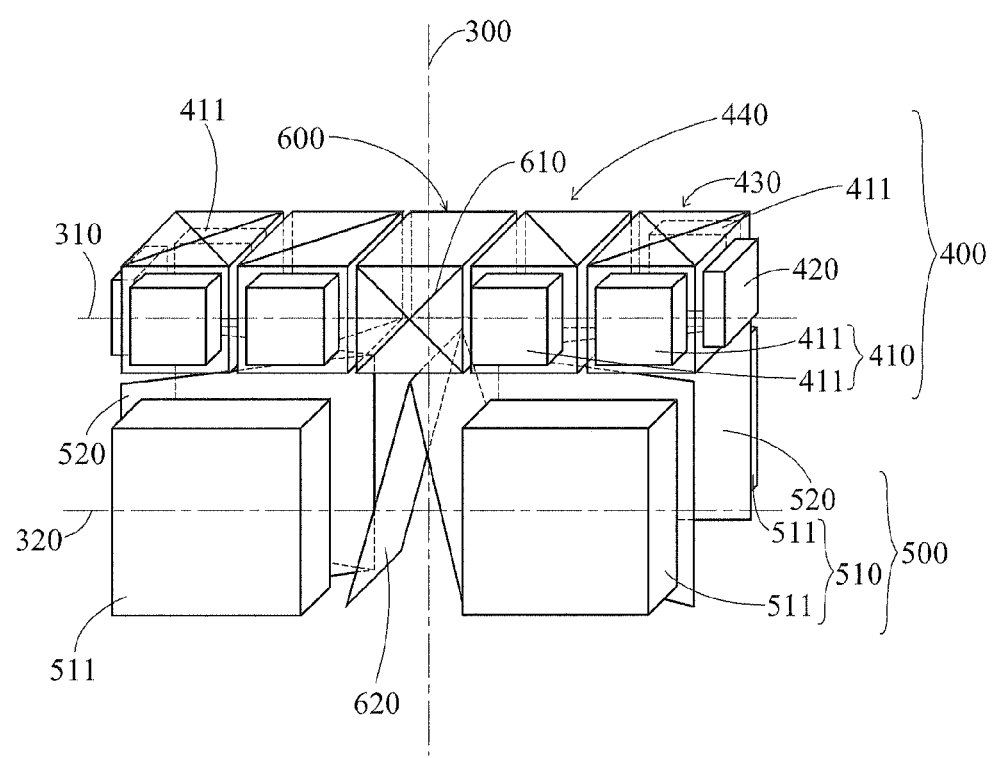
FIG. 2 is a perspective view of FIG. 1.

Specifically, in reference to FIG. 2, the two first optical modules 400 disposed at the two opposite sides of the first sub-optical axis 310 each have a first light source array 410, a second light source array 420, a first mirror array 430 and a second mirror array 440. The first light source array 410 and the second light source array 420 are used to emit a plurality of first beams 810 and a plurality of second beams 820 respectively, and the first light source array 410 further comprises a plurality of first sub-light source arrays 411. It shall be appreciated that in this embodiment, the first light source array 410 preferably comprises three first sub-light source arrays 411, of which two first sub-light source arrays 411 are disposed adjacent to the second light source array 420 and opposite to each other. The other first sub-light source array 411 is disposed between the two first sub-light source arrays 411 described above and the main optical axis 300; and the first beams 810 from the three first sub-light source arrays 411 are emitted towards the first sub-optical axis 310.

Figure 3:
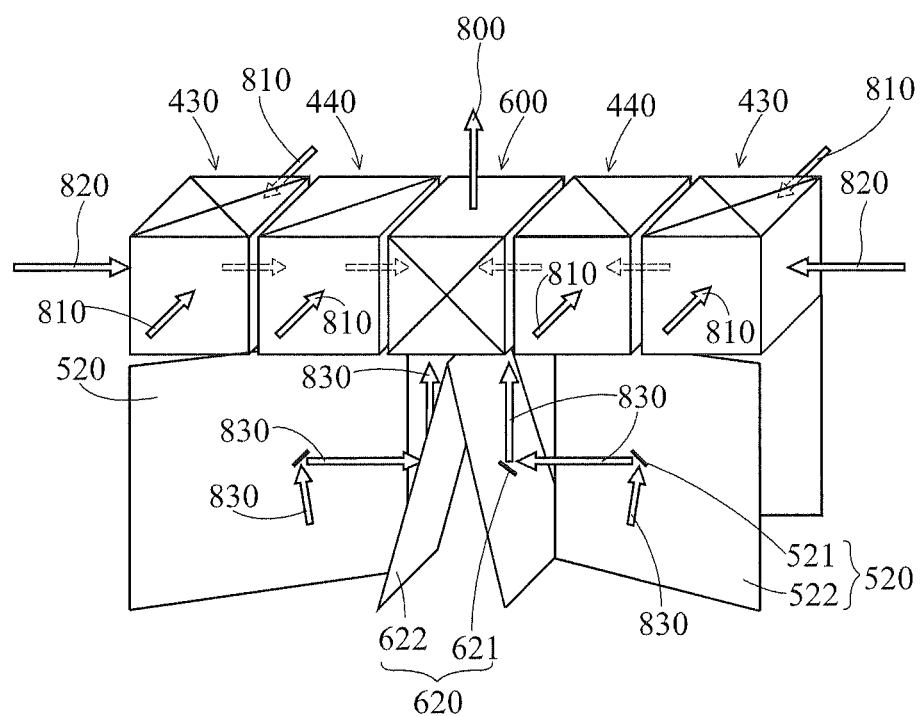
FIG. 3 is a schematic view illustrating the traveling paths of a plurality of first beams, a plurality of second beams and a plurality of third beams in the light source system according to the present invention.

As shown in FIG. 3, the first light source array 410, the second light source array 420 and a third light source array 510 shown in FIG. 1 are omitted here for ease of understanding and description. With reference to FIG. 2, the first mirror array 430 of the first optical module 400 is disposed in a space surrounded by the two first sub-light source arrays 411 and the second light source array 420 described above, and the second mirror array 440 is disposed between the first mirror array 430 and the main optical axis 300 and adjacent to the first mirror array 430.

Figure 4:
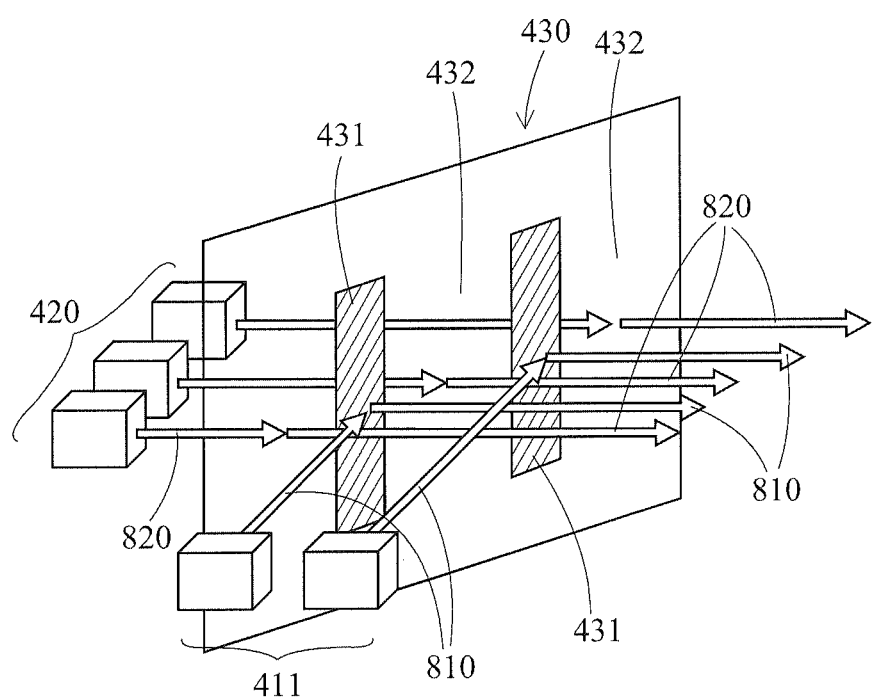
FIG. 4 is a schematic view illustrating a first mirror array of a first optical module in the light source system according to the present invention.

FIG. 4 illustrates a schematic view of a plurality of first mirrors 431 and a plurality of gaps 432 disposed in the first mirror array 430. The first mirrors 431 are adapted to define the plurality of gaps 432. Thus, the first beams 810 are reflected by the first mirrors 431 of the first mirror array 430 and the second beams 820 are allowed to pass through the gaps 432 so that the first beams 810 and the second beams 820 are integrated by the first mirror array 430 and then emitted along the first sub-optical axis 310. It shall be appreciated that the first mirrors 431 described above are disposed in parallel in the first mirror array 430 along the Y-axis direction to define the gaps 432 that are also disposed in parallel along the Y-axis direction; however, as will be readily known by those skilled in this art, the first mirrors 431 may also be disposed along other directions to define the gaps 432. For instance, the first mirrors 431 may be disposed in parallel in the first mirror array 430 along the X-axis direction to define the gaps 432 that are also disposed in parallel along the X-axis direction, and this can also accomplish the objective of integrating the first beams 810 and the second beams 820 for emission along the first sub-optical axis 310.

Figure 5:
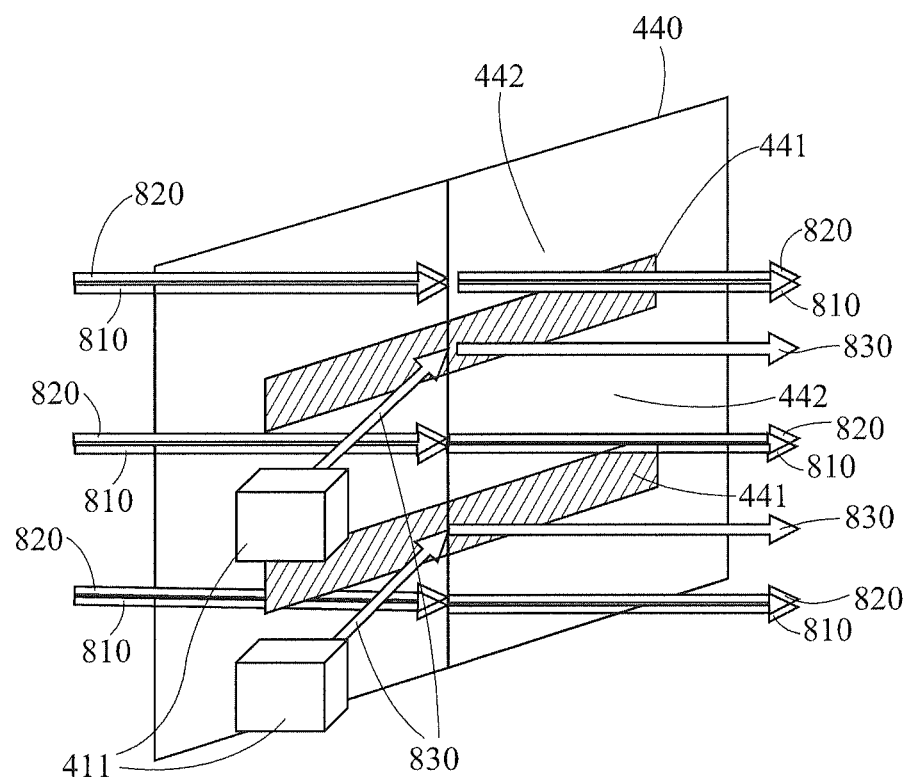
FIG. 5 is a schematic view illustrating a second mirror array of the first optical module in the light source system according to the present invention.

As shown in FIG. 5, similar to the first mirror array 430, the second mirror array 440 has a plurality of second mirrors 441 which are adapted to define a plurality of gaps 442. Thus, the third beams 830 are reflected by the second mirrors 441 of the second mirror array 440, and the first beams 810 and the second beams 820 emitted together from the first mirror array 430 are allowed to pass through the gaps 442 to travel towards the main optical axis 300 along the first sub-optical axis 310 together with the third beams 830. Likewise, positional relationships between the second mirrors 441 and the gaps 442 can also be readily modified by those skilled in the art as in the first mirror array 430, so other implementations of the second mirror array 440 will not be further described herein.

Figure 6:
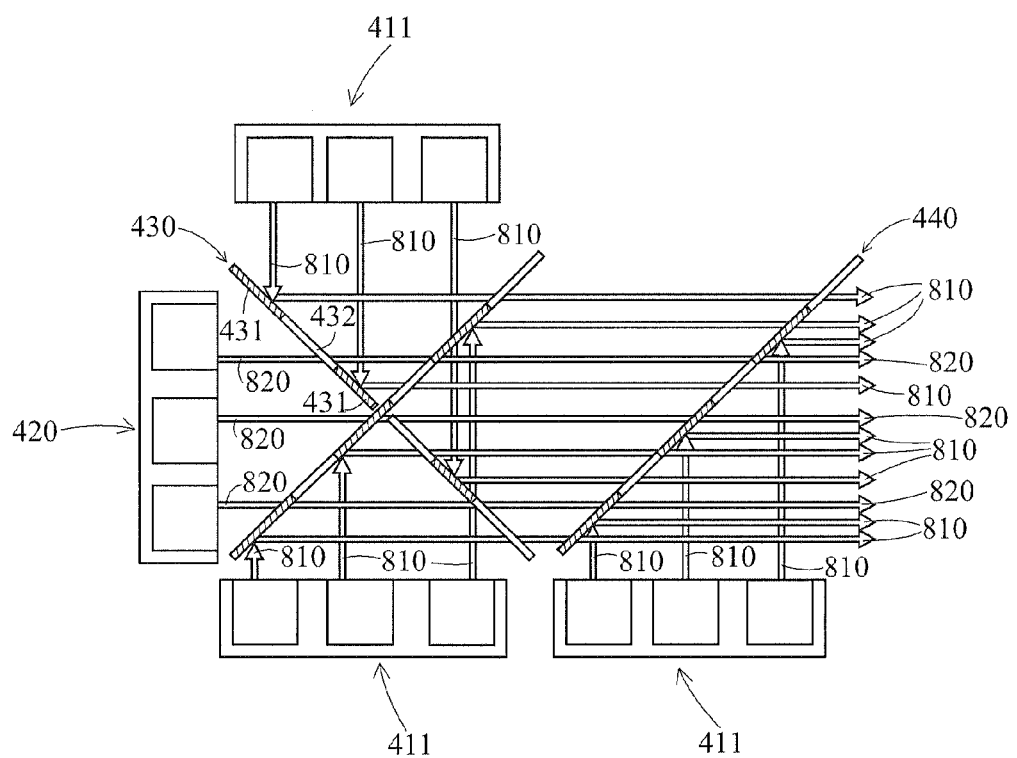
FIG. 6 is a schematic view illustrating beam integration in the first optical module of the light source system according to the present invention.

Hereinbelow, the relationships among the first sub-light source array 411, the second light source array 420, the first mirror array 430 and the second mirror array 440 in each of the first optical modules 400 will be further described herein. As shown in FIG. 6, the two first sub-light source arrays 411 disposed outside the first mirror array 430 are adapted to emit the first beams 810 towards the first sub-optical axis 310 respectively so that the first beams 810 are reflected by the first mirrors 431; meanwhile, the second light source array 420 disposed outside the first mirror array 430 is adapted to emit the second beams 820 along the first sub-optical axis 310 so that the second beams 820 pass through the gaps 432. In this way, the first beams 810 and the second beams 820 emitted by the two first sub-light source arrays 411 and the second light source array 420 respectively are adapted to be integrated by the first mirror array 430 to travel towards the second mirror array 440 disposed adjacent to the first mirror array 430. The first beams 810 and the second beams 820 from the first mirror array 430 pass through the gaps 442 of the second mirror array 440 and are then integrated with the first beams 810 which are emitted from the other first sub-light source array 411 and reflected by the second mirrors 441; and then, all these beams propagate together towards the main optical axis 300 along the first sub-optical axis 310. Likewise, the other first optical module 400 disposed with respect to the main optical axis 300 functions also in the same way, so it will not be further described herein.

Figure 7:
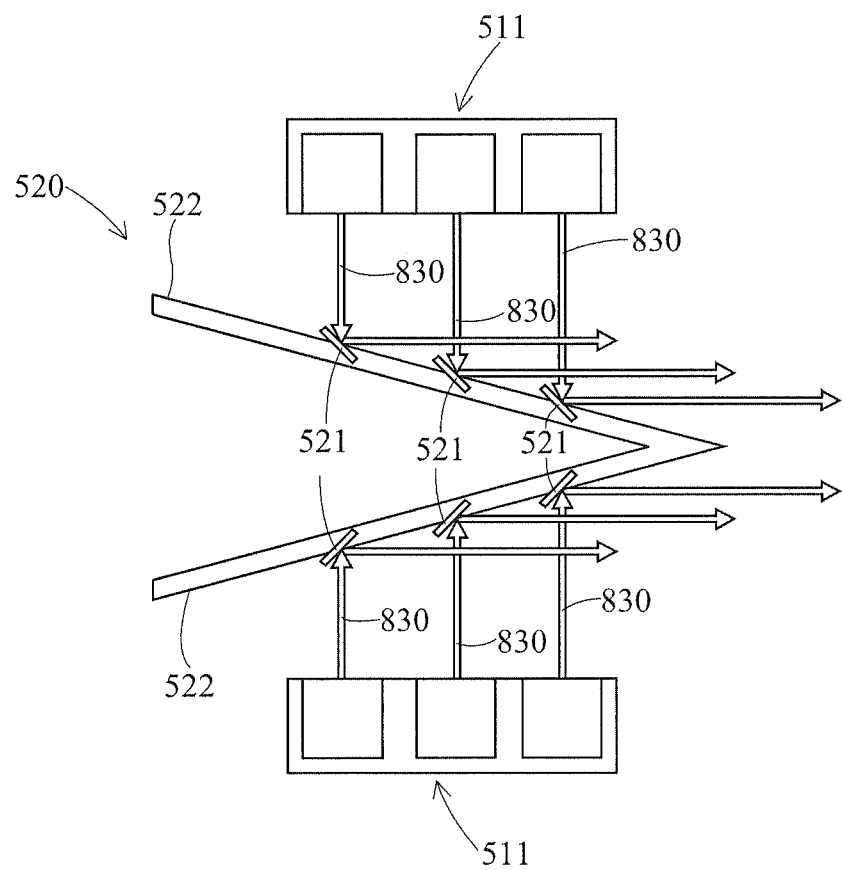
FIG. 7 is a schematic view illustrating a first stepped mirror of a third optical module in the light source system according to the present invention.

In reference to FIG. 2, the two second optical modules 500 each comprise a third light source array 510 and a first stepped mirror 520, and are disposed at two sides of the main optical axis 300 along the second sub-optical axis 320. Hereinafter, only one of the second optical modules 500 will be firstly described herein. In reference to FIG. 7 as well, the third light source array 510 of the second optical module 500 comprises two third sub-light source arrays 511 adapted to emit a plurality of third beams 830. The first stepped mirror 520 comprises a plurality of first reflecting surfaces 521 disposed along a first positioning plane 522 that is not parallel with the first reflecting surfaces 521. The first reflecting surfaces 521 of the first stepped mirror 520 are adapted to reflect the third beams 830 to the main optical axis 300 along the second sub-optical axis 320. Likewise, the other second optical module 500 disposed with respect to the main optical axis 300 functions also in the same way, so it will not be further described herein. Additionally, in this embodiment, each of the first reflecting surfaces 521 preferably includes an angle of 45 degrees with the second sub-optical axis 320 so that a reflection angle of 90 degrees is formed when each of the third beams 830 is incident on the first reflecting surfaces 521.

In reference to FIG. 3, the third optical module 600 is adapted to integrate the first beams 810 emitted by the first light source array 410, the second beams 820 emitted by the second light source array 420 and the third beams 830 emitted by the third light source array 520 into a main beam 800 for projection along the main optical axis 300. Specifically, the third optical module 600 comprises two dichroic mirrors 610 and a second stepped mirror 620. The second stepped mirror 620 has a plurality of second reflecting surfaces 621 disposed along a second positioning plane 622 that is not parallel with the second reflecting surfaces 621. The second reflecting surfaces 621 of the second stepped mirror 620 are adapted to reflect the third beams 830 emitted from the second optical modules 500 along the main optical axis 800. Because the second stepped mirror 620 has just the same function as the first stepped mirror 520, it will not be further described herein.

Additionally, the two dichroic mirrors 610 disposed between the two first optical modules 400 are adapted to reflect the first beams 810 and the second beams 820 emitted from the two first optical modules 400 respectively along the main optical axis 310, and the third beams 830 reflected by the second reflecting surfaces 621 as described above are adapted to pass through the two dichroic mirrors 610 so that the first beams 810, the second beams 820 and the third beams 830 are integrated by the third optical module 600 into the main beam 800.

In this embodiment, the first light source array 410, the second light source array 420 and the third light source array 510 described above are all laser arrays. The first beams 810 and the second beams 820 emitted by the two first optical modules 400 are blue beams and red beams respectively, while the third beams 830 emitted by the two second optical modules 500 are all green beams. Meanwhile, as shown in FIG. 2, the first mirror array 430 of the first optical module 400 is an X-cube or cross-type mirror array, while the two dichroic mirrors 610 are X-cube or cross-type mirrors disposed in the third optical module 600. Moreover, the light source system 200 further comprises a plurality of cooling devices (not shown) disposed adjacent to the two first optical modules 400, the two second optical modules 500 and the third optical module 600 respectively to reduce their operating temperatures effectively and quickly during operation.

According to the above descriptions, through the cooperation of the two first optical modules 400, the two second optical modules 500 and the third optical module 600 in the light source system 200 of the present invention, the red laser beams, the blue laser beams and the green laser beams emitted by the individual light source arrays respectively can be integrated and redirected by the first mirror array 430, the second mirror array 440, the first stepped mirror 520 and the second stepped mirror 620 to be projected along the main optical axis 800. In this way, the volume of the laser light source can be minimized and the brightness level of the laser light source can be effectively improved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light source system for use in a projector, comprising:
   a main optical axis;
   a first sub-optical axis;
   a second sub-optical axis;
   at least one first optical module, comprising:
      a first light source array for emitting a plurality of first beams;
      a second light source array for emitting a plurality of second beams; and
      a first mirror array comprising a plurality of first mirrors, wherein the first mirrors are adapted to define a plurality of gaps, the first beams are reflected by the first mirrors of the first mirror array, the second beams are allowed to pass through the gaps, and the first mirror array integrates and emits the first beams and the second beams along the first sub-optical axis;
   at least one second optical module, comprising:
      a third light source array for emitting a plurality of third beams; and
      a first stepped mirror comprising a plurality of first reflecting surfaces, wherein the first reflecting surfaces are disposed along a first positioning plane that is not parallel to the first reflecting surfaces, and the first reflecting surfaces of the first stepped mirror are adapted to reflect and emit the third beams to the main optical axis along the second sub-optical axis; and
   a third optical module adapted to integrate the first beams, the second beams and the third beams into a main beam for projection along the main optical axis;
   wherein the third optical module comprises at least one second stepped mirror, the at least one second stepped mirror comprises a plurality of second reflecting surfaces disposed on an exterior of the at least one second stepped mirrors and are disposed along a second positioning plane that is not parallel to the second reflecting surfaces, and the second reflecting surfaces of the second stepped mirror are adapted to reflect the third beams emitted from the at least one second optical module along the main optical axis.

2. The light source system as claimed in claim 1, wherein the first light source array comprises a plurality of first sub-light source arrays for emitting the first beams to the first mirror array and a second mirror array adjacent to the first mirror array.

3. The light source system as claimed in claim 2, wherein the second mirror array comprises a plurality of second mirrors adapted to define a plurality of gaps, the first beams are reflected by the second mirrors of the second mirror array, and the first beams and the second beams integrated and projected by the first mirror array are allowed to pass through the gaps and are emitted along the first sub-optical axis.

4. The light source system as claimed in claim 1, wherein the third light source array comprises a plurality of third sub-light source arrays adapted to project the third beams to the first reflecting surfaces of the first stepped mirror.

5. The light source system as claimed in claim 1, wherein the third optical module further comprises at least one dichroic mirror for reflecting the first beams and the second beams emitted from the at least one first optical module along the main optical axis, and the third beams reflected by the second stepped mirror is adapted to pass through the at least one dichroic mirror.

6. The light source system as claimed in claim 5, wherein the at least one dichroic mirror comprises two dichroic mirrors.

7. The light source system as claimed in claim 6, wherein the two dichroic mirrors are X-cube or cross-type mirrors disposed in the third optical module.

8. The light source system as claimed in claim 1, wherein the at least one first optical module of the light source system is two first optical modules, and the two first optical modules are disposed along the first sub-optical axis at two opposite sides of the main optical axis.

9. The light source system as claimed in claim 8, wherein the at least one second module of the light source system is two second optical modules, and the two second optical modules are disposed along the second sub-optical axis at two opposite sides of the main optical axis.

10. The light source system as claimed in claim 1, wherein the at least one second stepped mirror of the third optical module is two second stepped mirrors.

11. The light source system as claimed in claim 1, wherein the first light source array, the second light source array and the third light source array are laser arrays.

12. The light source system as claimed in claim 11, wherein the first beams or the second beams are red beams.

13. The light source system as claimed in claim 11, wherein the first beams or the second beams are blue beams.

14. The light source system as claimed in claim 11, wherein the third beams are green beams.

15. The light source system as claimed in claim 1, wherein the first sub-optical axis are parallel with the second sub-optical axis, and the first sub-optical axis and the second sub-optical axis are orthogonal to the main optical axis, respectively.

16. The light source system as claimed in claim 1, wherein the first mirror array is an X-cube or cross-type mirror array.

17. The light source system as claimed in claim 1, further comprising a plurality of cooling devices disposed adjacent to the first optical module, the second optical module and the third optical module respectively.

* * * * *